(12) United States Patent
Le

(10) Patent No.: US 7,983,684 B2
(45) Date of Patent: *Jul. 19, 2011

(54) METHODS AND APPARATUS FOR DETERMINING RF TRANSMITTER PLACEMENT VIA LOCAL COVERAGE OPTIMIZATION

(75) Inventor: Vinh Le, Fremont, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 780 days.

This patent is subject to a terminal disclaimer.

(21) Appl. No.: 11/669,411

(22) Filed: Jan. 31, 2007

(65) Prior Publication Data

US 2008/0182584 A1    Jul. 31, 2008

(51) Int. Cl.
*H04W 40/00*    (2009.01)
(52) U.S. Cl. .................. 455/446; 455/414.1; 455/422.1; 455/423; 455/457

(58) Field of Classification Search .................. 455/446, 455/414.1, 422.1, 423–425, 447–449, 457
See application file for complete search history.

(56) References Cited

U.S. PATENT DOCUMENTS

2006/0002326 A1 * 1/2006 Vesuna ........................ 370/328
2006/0205402 A1 * 9/2006 Banavar et al. ............ 455/426.1

FOREIGN PATENT DOCUMENTS

WO    WO 0178327 A2 * 10/2001

* cited by examiner

Primary Examiner — Wayne Cai

(57) ABSTRACT

Systems and methods are provided for optimizing the placement of RF components within an environment. The system operates by defining a spatial model associated with the environment, determining a first placement location of the RF device within the spatial model, defining a localized reference area, determining a coverage area associated with the RF device, identifying a set of gaps associated with the coverage area within the reference area, determining a second placement location of the RF device within the spatial model based on the set of gaps, and placing the AP in the second placement location within the environment.

12 Claims, 3 Drawing Sheets

US 7,983,684 B2

METHODS AND APPARATUS FOR DETERMINING RF TRANSMITTER PLACEMENT VIA LOCAL COVERAGE OPTIMIZATION

TECHNICAL FIELD

The present invention relates to wireless local area networks (WLANs) and other networks incorporating RF elements and/or RF devices. More particularly, the present invention relates to methods for automating the placement of RF devices, such as access points, within an environment.

BACKGROUND

There has been a dramatic increase in demand for mobile connectivity solutions utilizing various wireless components and WLANs. This generally involves the use of wireless access points that communicate with mobile devices using one or more RF channels (e.g., in accordance with one or more of the IEEE 802.11 standards).

At the same time, RFID systems have achieved wide popularity in a number of applications, as they provide a cost-effective way to track the location of a large number of assets in real time. In large-scale applications such as warehouses, retail spaces, and the like, many RFID tags may exist in the environment. Likewise, multiple RFID readers are typically distributed throughout the space in the form of entryway readers, conveyer-belt readers, mobile readers, and the like, and these multiple components may be linked by network controller switches and other network elements.

Because many different RF transmitters and other components may exist in a particular environment, the deployment and management of such systems can be difficult and time-consuming. For example, it is desirable to configure access points and other such RF components such that RF coverage is complete within certain areas of the environment. Accordingly, there exist various RF planning systems that enable a user to predict indoor/outdoor RF coverage. The result is a prediction as to where the transmitters should be placed within the environment. Such systems are unsatisfactory in a number of respects, however, as they fall short of the requirements due to the presence of gaps and holes.

BRIEF SUMMARY

In general, systems and methods are provided for optimizing the placement of RF components within an environment. A method in accordance with one embodiment includes: defining a spatial model associated with the environment; determining a first placement location of the RF device within the spatial model; determining a coverage area associated with the RF device; identifying a set of gaps associated with the coverage area; calculating a coverage metric based on the set of gaps; determining a second placement location of the RF device within the spatial model based on the coverage metric; and placing the AP in the second placement location within the environment if the coverage metric is less than or equal to a predetermined threshold.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
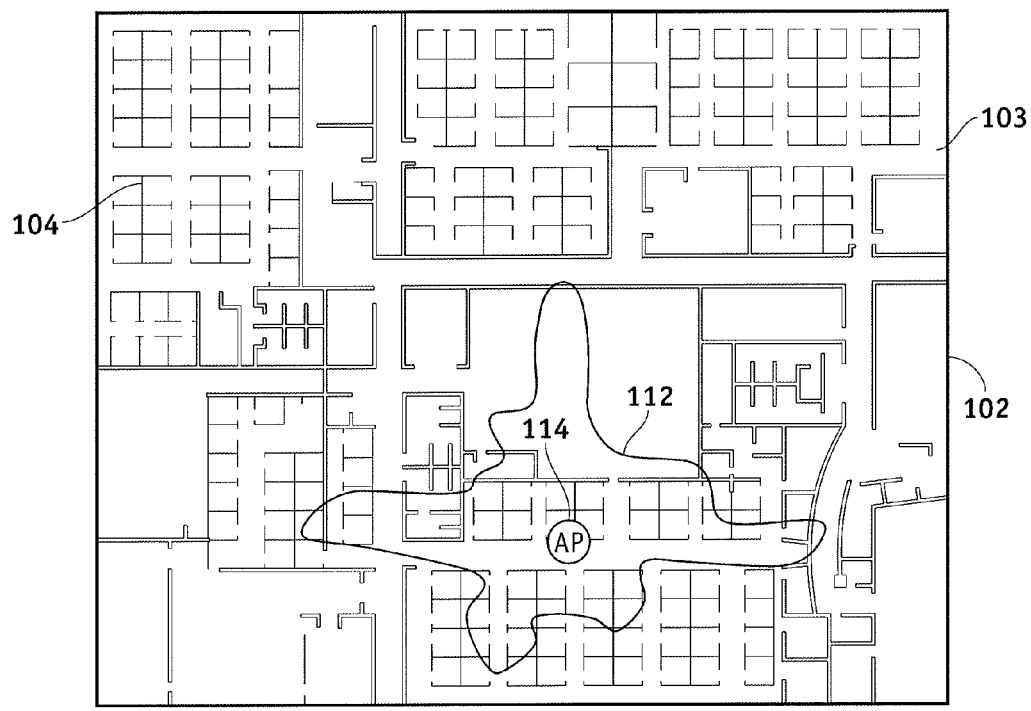
FIG. 1 is an example floor plan useful in depicting systems and methods in accordance with the present invention.

The present invention relates to a method of optimizing the location of access points and other such RF components using local RF coverage optimization—i.e., by adaptively considering only a subset of the environment. In this regard, the following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission and data formatting protocols and that the system described herein is merely one example embodiment of the invention.

For the sake of brevity, conventional techniques related to signal processing, data transmission, signaling, network control, the 802.11 family of specifications, wireless networks, RFID systems and specifications, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example," rather than "model." Although the figures may depict example arrangements of elements, additional intervening elements, devices, features, or components may be present in an embodiment of the invention.

Referring to the conceptual plan view shown in FIG. 1, an AP 114 or other RF device is provided within an environment 103 defined by a boundary 102. AP 114 has an associated RF coverage area (or simply "coverage") 112, which corresponds to the effective range of its antenna or RF transmitter, as described in further detail below.

Environment 103, which may correspond to a workplace, a retail store, a home, a warehouse, or any other such space (including outdoors and/or indoors), will typically include various physical features 104 that affect the nature and/or strength of RF signals received and/or sent by AP 114. Such feature include, for example, architectural structures such as doors, windows, partitions, walls, ceilings, floors, machinery, lighting fixtures, and the like.

Boundary 102 may have any arbitrary geometric shape, and need not be rectangular as shown in the illustration. Indeed, boundary 102 may comprise multiple topologically unconnected spaces, and need not encompass the entire workplace in which AP 114 is deployed. Furthermore, the present invention is not limited to two-dimensional layouts; it may be extended to three dimensional spaces as well.

AP 114 is configured to wirelessly connect to one or more mobile units (MUs) (not shown) and communicate one or more switches, routers, or other networked components via appropriate communication lines (not shown). Any number of additional and/or intervening switches, routers, servers, and other network components may also be present in the system.

At any given time, 114 may have a number of associated MUs, and is typically capable of communicating with through multiple RF channels. This distribution of channels varies greatly by device, as well as country of operation. For example, in accordance with an 802.11(b) deployment there are fourteen overlapping, staggered channels, each centered 5 MHz apart in the RF band.

As described in further detail below, AP 114 includes hardware, software, and/or firmware capable of carrying out the functions described herein. Thus, AP may comprise one or more processors accompanied by storage units, displays, input/output devices, an operating system, database management software, networking software, and the like. Such systems are well known in the art, and need not be described in detail here.

For wireless data transport, AP 114 may support one or more wireless data communication protocols—e.g., RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; GPRS; and proprietary wireless data communication protocols such as variants of Wireless USB.

Figure 2:
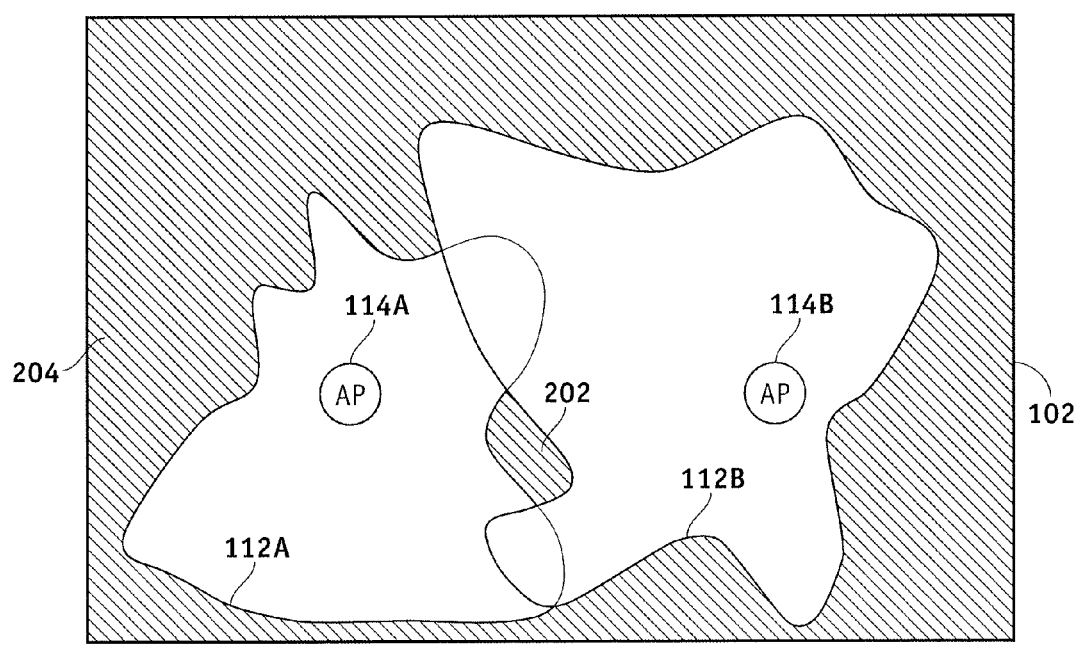
FIG. 2 is a conceptual top view of exemplary coverage areas for two RF transmitters in an environment.

Referring now to FIG. 2, when multiple APs are positioned within boundary 102, various gaps or "holes" in coverage (or "coverage areas") may exist. In a typical application, AP 114A may have been previously placed, and a new AP 114B is inserted to help with RF coverage. As illustrated, AP 114A has a corresponding coverage 112A, and AP 114B has a corresponding coverage 12B. These coverage areas may have any arbitrary shape or size, depending upon factors known in the art. For example, these coverage areas may be determined through a receiver signal strength indicator (RSSI) calculation, as is known in the art.

As shown, a gap 202 exists between coverage areas 112A and 112B, and a gap 204 exists between boundary 102 and the outer reaches of areas 112A and 112B. In accordance with the present invention, APs 114A and/or 114B are relocated to optimal positions based on a coverage metric, which may be iteratively recalculated adaptively until it reaches a predetermined coverage metric threshold (or simply "threshold").

The coverage metric may be any quantitative or qualitative measure of the gaps within an area at any given time. In one embodiment, for example, the coverage metric is equal to the total planar area of all gaps within the relevant area. The coverage metric may also take into account and assist with reducing overlapping coverage areas.

The coverage metric may be computed only within a subset of the space encompassed by boundary 102. That is, as shown in FIG. 3, a reference area (or "reference block") 304 is defined, and the coverage metric calculations are computed based on the gaps within that area—which may change size and/or position as the various APs 114 are moved to reduce the coverage metric within that area. In the illustrated embodiment, for example, two gaps are present: gap 202 and gap 302. Each of these gaps has planar geometrical attributes such as area, shape, centroid, and the like, all of which may be calculated (e.g., using suitable hardware and software) given the shapes of coverage areas 112.

Reference area 304 is shown as rectangular; however, the present invention is not so limited. In the event reference area 304 is rectangular, it is desirable to define one or more corners of area 304 such that those corners correspond to the location of one or more APs 114 (e.g., a previously-placed AP). Alternatively, reference area 304 may be defined based on the position of other system components as well as barriers and the like.

Operation of the system generally proceeds as follows. First, modeling information regarding the environment and components within the environment are collected to produce a spatial model. This information may include, for example, building size and layout, country code, transmit power per AP, antenna gain, placement constraints, transmit power constraints, data rate requirements, coverage requirements, barrier information, and the like.

Figure 3A:
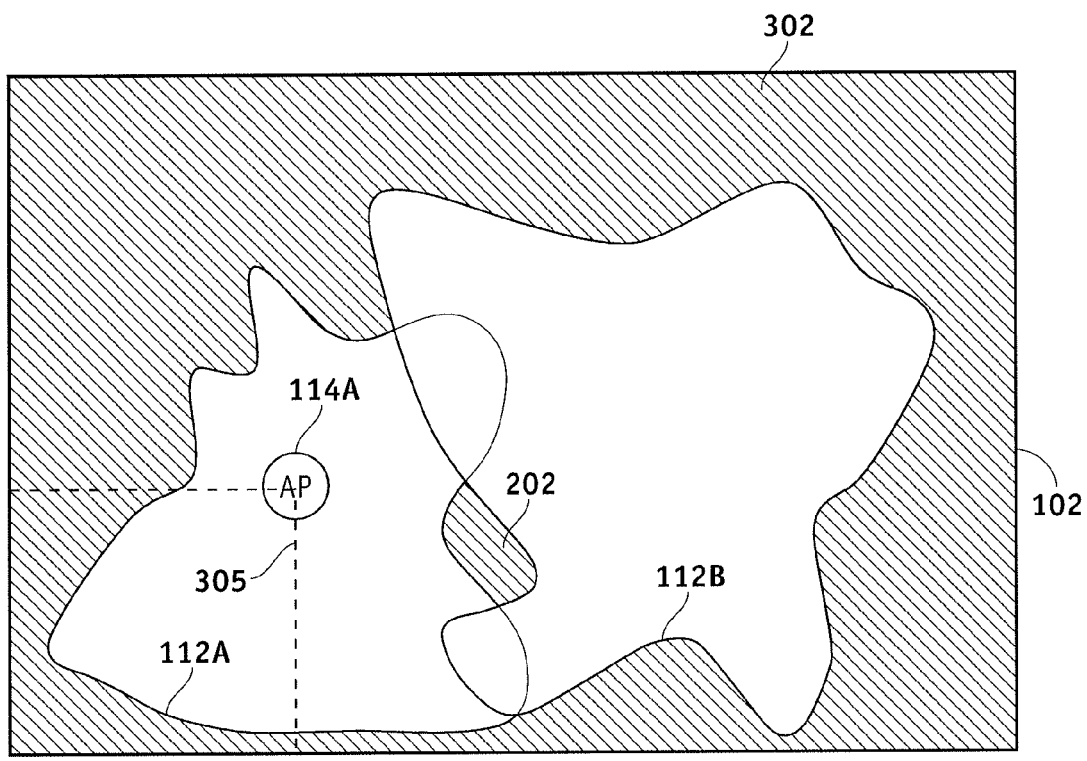
FIGS. 3A and 3B depict the environment of FIG. 2 with changing location of a reference area.

In one embodiment, the very first time the algorithm starts, AP 114A will take an initial position as shown in FIG. 3A. The initial position of AP 114A is computed based upon a suitable formula constrained by RF coverage requirements. The size and shape of the coverage areas 112 within boundary 102 are then determined for AP 114A. In this embodiment, a reference area 305 is formed by the AP (x,y) coordinate, the leftmost outer wall of boundary 102, and the bottom outer wall of boundary 102. An optimization process is then performed to determine the best location for AP 114A. At each iteration of the process, AP 114A might have a new (x,y) coordinate but the reference area 305 definition with respect to the whole graph remains the same. Next, any contiguous gaps within reference area 305 are identified, and the shape, size, and any other suitable attributes for those gaps are computed. The coverage metric is then computed for reference area 305, based, for example, on the total area of the gap 205.

Figure 3B:
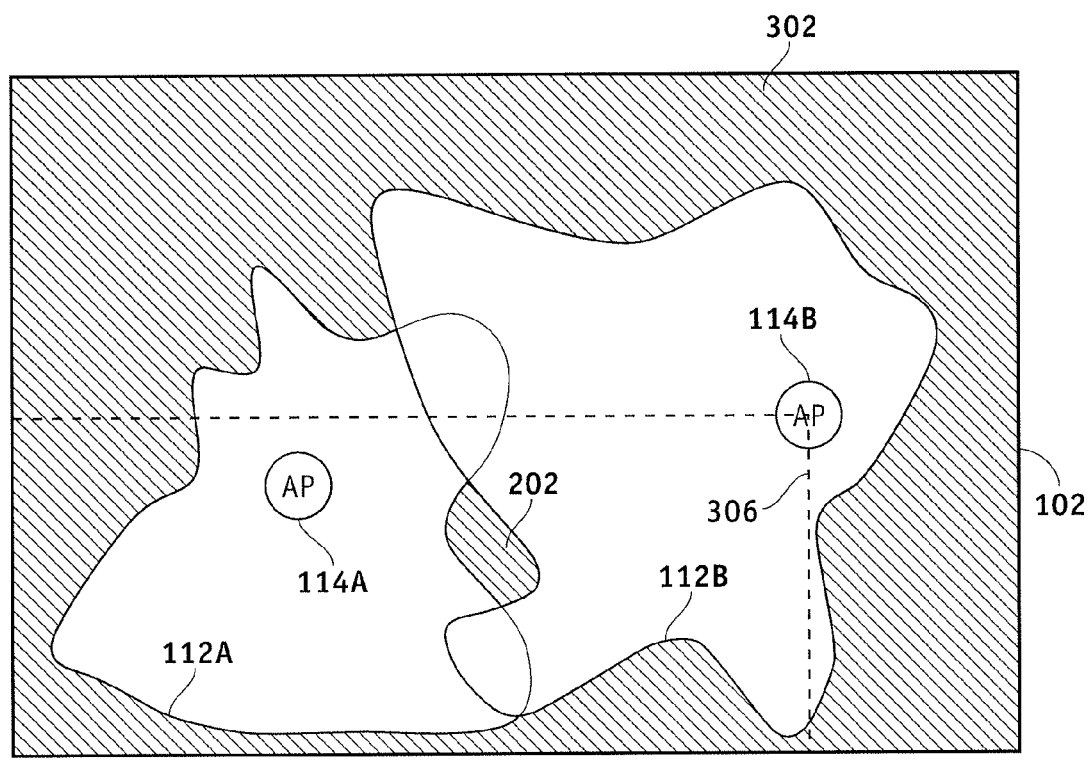

When AP 114a has settled into its final position, a new AP is suitably added, as shown in FIG. 3B. In this example, AP 114B is the second AP to be added. Again, AP 114A will take a general initial position as shown. However, in a different variation of the implementation, the position of the next—e.g. second—AP might have a special relationship with the last AP. That is, the next AP initial position might take the same y coordinate as the last AP, while the x coordinate is derived computationally. In either case, a new reference area 306 is formed by the second AP (x,y) coordinate and the same outer wall of the graphs as the previous case. The optimization process is again initiated for the second AP based only upon reference area 306. In an alternate example, the reference area 306 may be a rectangle with two corners bounded by the two APs 114A and 114B. This technique can be used to greatly reduce computation time.

Once the coverage metric is computed, the system determines a new position for one or more of the APs—e.g., the most recent AP to enter the environment. Next, the AP (e.g., AP 114B) is moved within the spatial model to that new position. The new position may be determined by defining an angular direction in which the AP should move, as well as a step size (i.e., distance) that defines the scalar distance. The step size may be selected in accordance with known principles to achieve the desired stability and convergence time.

The angular direction of AP movement during an iteration may be specified in any suitable manner based on gap locations. In one embodiment, an average gap metric is computed based on an integration or discrete summation of the distances from the AP to points within a gap. The angular direction may correspond a line leading from the current placement of the AP to an extrema (i.e., a point on the perimeter) of one of the gaps. In a particular embodiment, the angular direction is defined by the point on the perimeter of the gap that is farthest away from the current position of the AP.

After the subject AP has been relocated, the system again determines the size and shape of the coverage areas, redefines the reference area 304 (e.g., based on the new location of the APs within the system), and recomputes the coverage metric. If the coverage metric is equal to or less than a predefined threshold, the system once again computes a new position for one or more of the APs, and the process continues as before until the predefined threshold is reached or it is determined that the process should otherwise stop (e.g., due to the non-existence of a solution, non-convergence, or a time out event).

Figure 4:
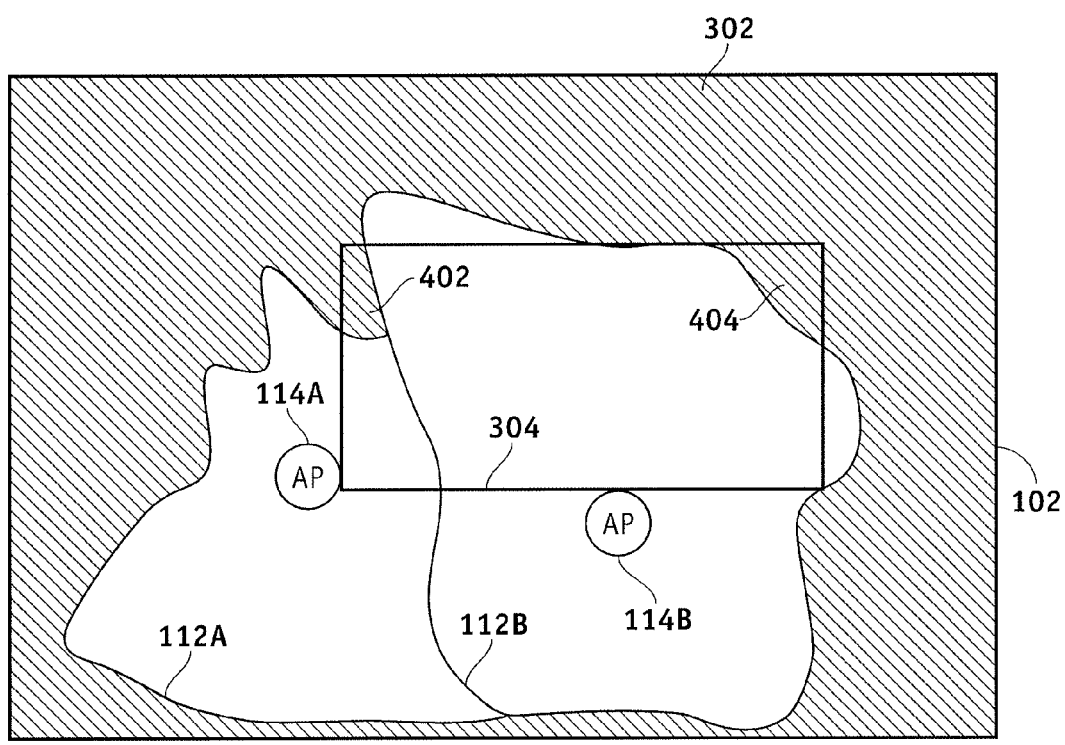
FIG. 4 is the environment of FIGS. 3A and 3B after relocation of the RF transmitters and redefinition of the reference area.

FIG. 4 shows the example of FIG. 3B after relocation of AP 114B. As depicted, the gaps 202 and 302 of FIG. 3 have been eliminated or substantially eliminated such that the coverage metric within the previously-defined reference area are within the predefined threshold, and a new reference area 304 has been defined for the purposes of further adaptively improving coverage. The shape and size of coverage areas 112A and 112B have changed accordingly, resulting in two gaps 402 and 404 within reference area 304. The system may the proceed to improve coverage either by moving AP 114A or 114B, or adding a new AP within boundary 102.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method of positioning an RF device within an environment that contains one or more previously positioned RF devices, comprising the steps of:
   defining a spatial model associated with the environment;
   determining a first placement location of the RF device within the spatial model;
   determining an actual coverage area associated with the RF device and the previously positioned RF devices;
   defining a reference area within the environment such that the reference area is partially defined by a position of at least one of the previously positioned RF devices;
   identifying a first set of gaps associated with the actual coverage area within the reference area, wherein the identifying includes determining a geometrical attribute of the first set of gaps;
   computing a first coverage metric based on the geometrical attribute of the first set of gaps;
   determining a second placement location of the RF device within the spatial model based on the first set of gaps;
   identifying a second set of gaps associated with the actual coverage area within the reference area, wherein the identifying includes determining a geometrical attribute of the second set of gaps;
   computing a second coverage metric based on the geometrical attribute of the second set of gaps; and
   if the second coverage metric is below a predetermined threshold, placing the RF device in the second placement location.

2. The method of claim 1, wherein determining the actual coverage area associated with the RF device includes performing an RSSI calculation.

3. The method of claim 1, wherein defining the spatial model includes determining the location of one or more barriers within the environment.

4. The method of claim 1, wherein the reference area is rectangular.

5. The method of claim 4, wherein the reference area has at least one corner corresponding to the location of the RF device.

6. A system for positioning an RF device within an environment, comprising:
   a processor configured to accept a spatial model associated with the environment, determine a first placement location of the RF device within the spatial model, determine an actual coverage area associated with the RF device and at least one previously positioned RF device, determine a reference area at least partially defined by a position of the at least one previously positioned RF devices, identify a geometrical attribute of a first set of gaps associated with the actual coverage area within the reference area, compute a first coverage metric based on the geometrical attribute of the first set of gaps, determine a second placement location of the RF device within the spatial model based on the first set of gaps, identify a geometrical attribute of a second set of gaps within the reference area, compute a second coverage metric based on the geometrical attribute of the second set of gaps, and determine an optimum position of the RF device based on the second coverage metric;
   a display for displaying the spatial model and the second placement location.

7. The system of claim 6, wherein the processor is further configured to compute a coverage metric based on the area of the set of gaps.

8. The system of claim 6, wherein the processor computes the actual coverage area associated with the RF device by performing an RSSI calculation.

9. The system of claim 6, wherein the spatial model includes the location of one or more barriers within the environment.

10. The system of claim 6, wherein the RF device is a wireless access point.

11. The system of claim 10, wherein the wireless access point conforms to a 802.11 specification.

12. The system of claim 6, wherein the RF devices is selected from the group consisting of a WiMax device, a Bluetooth device, a Zigbee device, a UWB device, and a RFID device.

* * * * *